July 2, 1935. A. Y. DODGE Re. 19,628

LUBRICATING DEVICE

Original Filed June 27, 1932

INVENTOR.
ADIEL Y. DODGE
BY John A. Watson
ATTORNEY.

Reissued July 2, 1935

Re. 19,628

UNITED STATES PATENT OFFICE 19,628

LUBRICATING DEVICE

Adiel Y. Dodge, South Bend, Ind., assignor to The Lubrication Corporation, South Bend, Ind., a corporation of Delaware Original No. 1,946,065, dated February 6, 1934, Serial No. 619,494, June 27, 1932. Application for reissue April 2, 1934, Serial No. 718,734

15 Claims. (Cl. 285—25)

This invention relates to improvements in lubrication devices and more particularly to lubricant receiving nipples or fittings of the drive type wherein the fitting may be secured to the bearing or receiving member by driving the shank of the fitting into a preformed bore or recess in the receiving member.

A primary object of my invention is to provide a lubrication fitting capable of being so secured in a receiving member, such as a bearing, as to withstand relatively high pressures tending to blow the fitting therefrom, yet one relatively inexpensive to manufacture and secure.

Another object is to provide an improved fitting of such character that it may be replaced with ease should the necessity for replacement arise.

Another object of the invention is to provide an improved drive type lubricant receiving fitting which is especially adaptable for heavy duty and for use in such places as where impact or other shock is likely to be imparted thereto which might have a tendency to destroy or impair the mechanical and lubricant tight engagement between fitting and receiving member. This feature may be attributed to the disposal of the driven bond between fitting shank and receiving member well within the mouth of the preformed recess or bore in the receiving member.

Another object is to provide a drive type lubrication fitting wherein the tendency to displace metal of the receiving member into the recessed portion of the fitting shank during the driving operation is increased, due to the uniform resistance to the flow of metal away from the shank as distinguished from the displacement of metal at the mouth of the recess of bore.

Another object is to provide a drive type fitting in which that portion of the shank adjacent to the body of the fitting may be of relatively large diameter thus precluding the possibility of shearing the fitting through lateral impact.

Other objects, the advantages, and uses of the invention, will be, or should become apparent after reading the following description and claims and after consideration of the accompanying drawing forming a part of this specification, in which:

In general the drive type fittings selected for illustration herein comprise, a body portion A having a spherical head B for engagement with a lubricant dispensing nozzle, a shank C adapted to be wholly or partially received within a preformed recess on bore D in a bearing wall or receiving member E, a drive shoulder F formed on the shank C for displacing metal of the member E into an adjacent recess G in the side walls of the fitting shank.

Figure 1:
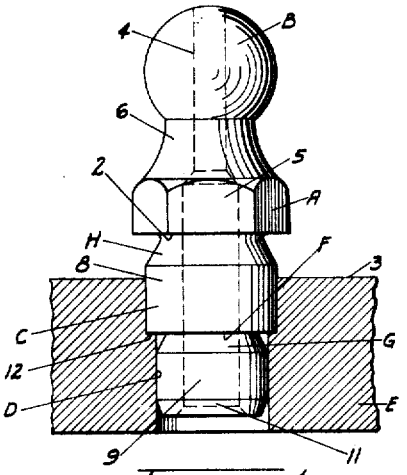
Fig. 1 is an elevation partly in section of a drive type lubrication fitting embodying the features of the invention, shown prior to being driven into the recess of a receiving member.
Figure 2:
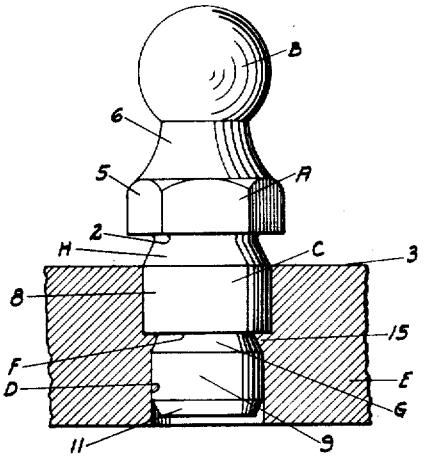
Fig. 2 is a similar view showing the parts subsequent to the driving of the fitting in place.

The drive fitting of Figs. 1 and 2 has in addition to the major elements described above a circumferential groove H immediately beneath the body A providing a relatively wide shoulder 2 lying in a plane perpendicular to the axis of the fitting for engagement with a bifurcated extraction tool whereby an upward thrust may be applied to the fitting to remove it from the receiving member E as for repair or replacement. It is intended that the entire groove H shall lie above the upper surface 3 of the receiving member E when the fitting has been driven therein as shown in Fig. 2.

A lubricant conducting passageway 4 extends longitudinally through the fitting with its inlet port or mouth located centrally of the spherical head B. The lower portion of the body A is formed with hexagonal side walls 5 so that a wrench may be engaged with the body to turn the fitting in the recess or bore D to partially loosen the fitting shank in the recess prior to its removal therefrom. That portion 6 of the body A adjacent to the spherical head B is tapered outwardly to the upper edges of the hexagonal side wall portion 5 to increase accessibility of a lubricant discharge nozzle to the head B and yet retain maximum strength in that part of the fitting exposed above the surface 3.

It will be noted that in both forms of the fitting illustrated that the shank C is divided into two major portions indicated at 8 and 9 respectively. The upper portion 8 is of greater external diameter than the lower portion 9, both being cylindrical in contour. The drive shoulder F is formed at the juncture of the said upper and lower shank portions and lies in a plane perpendicular to the axis of the shank. The recess G, one wall of which is formed by the drive shoulder F, is located substantially at the midpoint of the length of the shank. The remaining wall of the recess G slopes outwardly to the outer cylindrical wall of the lower portion 9 of the shank. The lower and outer edge of the shank C is chamfered as shown at 11 to aid in the entry of the lower portion of the shank into its cooperating portion of the recess or bore D.

Figure 4:
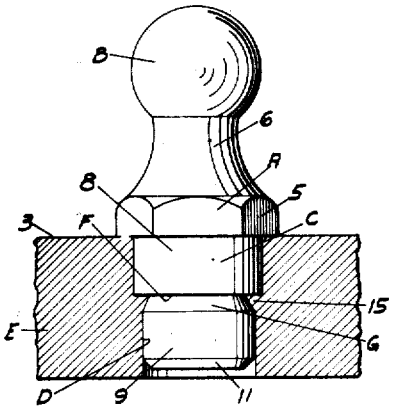
Fig. 4 is a view similar to Fig. 2 of that form of the fitting shown in Fig. 3.

In preforming the recess or bore D in a bearing sleeve or other receiving member E, it is necessary that the upper end of the recess be counter-bored to a diameter equal to that of the shank portion 8 and for a depth less than the length of that portion of the shank received within the recess as shown in Figs. 2 and 4 respectively. This arrangement provides a snug engagement of fitting and receiving member for a considerable distance beneath the surface 3 and hence precludes the tilting or other lateralwise movement of the fitting which might be caused by impact or other abuse subjected to the exposed portion of the fitting.

Figure 3:
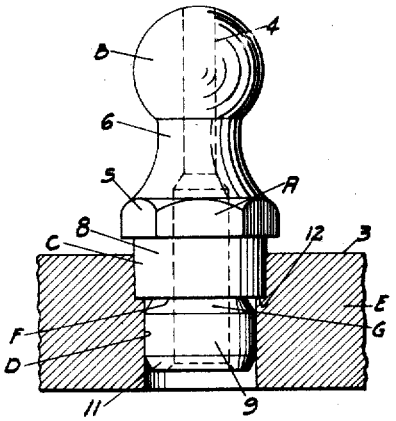
Fig. 3 is a view similar to Fig. 1 of a modified form of the drive fitting.
Figure 5:
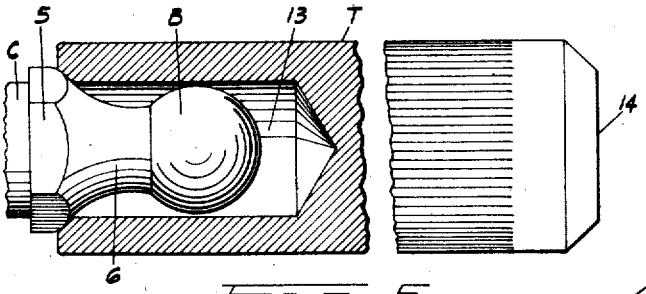
Fig. 5 is a view partly in section of a drive tool used for driving the fitting into the receiving member.

In Figs. 1 and 3 both forms of the fitting are shown with their shanks C initially admitted to the recess or bore D of the member E. When in this position with the drive shoulder F bearing upon the step 12 formed at the base of the counterbore a drive tool T having a socket 13 at its lower end may be applied to the fitting as shown in Fig. 5 with the head B and tapered portion 6 of the body within the socket 13 of the tool. The lower and inner wall of the socket 13 may be fashioned to conform with the adjacent wall of the tapered portion 6 so that an endwise blow or series of blows upon the head 14 of the tool with a hammer or mallet will drive the fitting into the recess D.

As the fitting is driven into the recess from its position of initial entry to the position shown in Figs. 2 and 4, the drive shoulder F will displace metal adjacent thereto into the recess G as shown at 15 to securely interlock the fitting shank C with the receiving member E. Due to the substantially uniform resistance to the flow of metal during the driving operation to a position other than that of within the recess 6, the complete occupation of the recess with displaced metal of the receiving member may be brought about with a minimum driven axial thrust upon the fitting.

The expressions "drive shoulder", "drive portion" and the like, as used in this description and the claims, mean a shoulder or similar or equivalent element which acts, under the influence of a force applied thereto, to deform, flow, displace, or otherwise effect a movement of the material of the member into which the fitting is driven, to an extent sufficient to engage such deformed, flowed, displaced or otherwise affected material in the groove or the like in the fitting; the fitting becoming self-locking thereby.

While I have illustrated and described several preferred forms of the invention, it is understood that this showing and description are illustrative only, and that I do not regard the invention as limited to the forms shown and described or otherwise except by the terms of the following claims.

I claim:

1. A drive type lubrication fitting comprising, a lubricant nozzle engaging portion and a shank adapted to be driven into a preformed bore in a receiving member, said shank being formed with a recess in the side wall thereof substantially at the midpoint of that portion of the shank admitted within said bore and a drive shoulder for displacing metal of said receiving member into said recess as the fitting is driven therein, said drive shoulder having a greater dimension radially of the fitting than the radial dimension of said bore at a place adjacent to the location of the recess when the fitting is completely driven into said bore.

2. A drive type lubrication fitting having a nozzle engaging head and a shank, said shank being divided longitudinally into two substantially cylindrical portions each of substantial length measured axially of the fitting, the upper of said portions being of greater external diameter than the lower portion to provide a drive shoulder therebetween, said shank being further formed with a recess in the side wall thereof at the juncture of said upper and lower portions.

3. A drive type lubrication fitting having a nozzle engaging head and a shank, said shank being divided longitudinally into two substantially cylindrical portions each of substantial length measured axially of the fitting, the upper of said portions being of greater external diameter than the lower portion to provide a drive shoulder therebetween, said shank being further formed with a recess in the side wall thereof substantially at the juncture of said upper and lower portions, one of the walls of said recess being inclined relative to the axis of the fitting.

4. A lubrication fitting member adapted to be driven into a receiving member by impact or pressure, said fitting member having a shoulder adapted to engage and to deform a portion of the receiving member to effect interlocking between the receiving member and fitting member as the fitting member is forced into the receiving member, and a portion of said fitting member that is adjacent to said shoulder having a groove of which at least one side is inclined relative to the axis of the fitting member for the reception of a deformed portion of the receiving member to effect interlocking engagement between the receiving member and the fitting member.

5. A lubrication fitting member adapted to be driven into a receiving member by impact or pressure, said fitting member having a shank and a shoulder on said shank, said shoulder being adapted to engage and to deform a portion of the receiving member to effect interlocking between the receiving member and the fitting member, and a coupler engageable head secured to said shank, said shank being formed with a depression parallel and adjacent to and substantially co-extensive with said shoulder for the reception of a deformed portion of the receiving member to effect interlocking engagement between the receiving member and the fitting member.

6. In combination, a metal bearing to be lubricated, a recess formed in said bearing, a fitting secured in said recess and formed with an annular depression, one wall of said fitting that defines said depression providing a shoulder sloping relative to the axis of the fitting, and said bearing having portions of metal displaced therefrom into said recess.

7. A lubrication fitting provided with a shank portion having a depression, said shank being adapted to be received in a bore in a receiving member, and means forming a part of said fitting for displacing metal of the receiving member from adjacent to the bore therein into the depression.

8. A lubrication fitting provided with a lubricant receiving end portion, an intermediate portion, a shank portion, and a drive portion between said intermediate portion and said shank portion, said drive portion being adapted to effect interlocking between a receiving member and the fitting, said shank portion being provided with a depression adjacent to said drive portion for interlocking with material of the receiving member.

9. A lubrication fitting provided with a lubricant receiving end portion, a shank portion, and a drive portion between said end portion and said shank portion, said drive portion being adapted to engage a part of a receiving member to effect a displacement of a part of the receiving member into interlocking engagement with said shank portion, said shank portion being formed with a shoulder for interlocking engagement with material of the receiving member displaced by said drive portion.

10. A lubrication fitting provided with a lubricant receiving end portion, a shank portion having an annular groove therein, said shank portion being adapted to be received in a recess in a receiving member, and a drive portion between said groove and said receiving end portion and adjacent to said groove, said drive portion being adapted to effect interlocking between the receiving member and fitting at said groove.

11. A lubrication fitting provided with a lubricant receiving end portion, a shank portion having an annular groove therein, said shank portion being adapted to be received in a recess in a receiving member, and a drive portion between said groove and said receiving end portion and adjacent to said groove, said drive portion being adapted to effect interlocking between the receiving member and fitting at said groove, one of the sides of said groove being tapered.

12. A lubrication fitting having a ball head, a reduced neck, a substantially cylindrical drive portion adapted to effect interlocking between a receiving member and the fitting, and a cylindrical shank having a diameter less than the diameter of said drive portion and having an annular groove formed therein adjacent to said drive portion, one side of said groove being inclined relative to the axis of the fitting and the opposed side of said groove being relatively perpendicular to the axis of the fitting.

13. A lubrication fitting having a ball head, a reduced neck, a substantially cylindrical drive portion, said drive portion being adapted to effect interlocking between a receiving member and said fitting, said drive portion having a greater diameter than said reduced neck, and a cylindrical shank having a diameter less than the diameter of said drive portion and having an annular groove formed therein adjacent to said drive portion, one side of said groove being inclined relative to the axis of the fitting and the other side of said groove being relatively perpendicular to the axis of the fitting.

14. In combination, a metal bearing member having a fitting receiving recess therein, a fitting including a shank portion, said shank portion being disposed in said recess and having a depression therein, a drive shoulder on said fitting above said shank effective to displace material from the bearing member into said depression, and material of said bearing member disposed in said depression and forming an interlocking connection between said fitting and bearing member.

15. In combination, a metal bearing member having a fitting receiving recess therein, a fitting having a shank portion, said shank portion being disposed in said bearing member recess, said shank having a depression therein within the limits of said recess, said depression having an inclined and substantially upwardly facing shoulder for interlocking engagement with material of said bearing member, and material of said bearing member displaced into said recess and in interlocking engagement with said upwardly facing shoulder.

ADIEL Y. DODGE.